(12) United States Patent
Ahn et al.

(10) Patent No.: US 10,557,548 B2
(45) Date of Patent: Feb. 11, 2020

(54) APPARATUS FOR PREVENTING MAL-OPERATION FOR AUTOMATIC TRANSMISSION

(71) Applicant: GM GLOBAL TECHNOLOGY OPERATIONS LLC, Detroit, MI (US)

(72) Inventors: Kyuhwan Ahn, Incheon (KR); Choonghee Rhew, Incheon (KR)

(73) Assignee: GM Global Technology Operations LLC, Detroit, MI (US)

( * ) Notice: Subject to any disclaimer, the term of this patent is extended or adjusted under 35 U.S.C. 154(b) by 120 days.

(21) Appl. No.: 15/780,961

(22) PCT Filed: Nov. 29, 2016

(86) PCT No.: PCT/KR2016/013893
§ 371 (c)(1),
(2) Date: Jun. 1, 2018

(87) PCT Pub. No.: WO2017/095115
PCT Pub. Date: Jun. 8, 2017

(65) Prior Publication Data
US 2018/0363772 A1 Dec. 20, 2018

(30) Foreign Application Priority Data
Dec. 1, 2015 (KR) .......................... 10-2015-0169795

(51) Int. Cl.
*F16H 61/18* (2006.01)
*B60K 20/02* (2006.01)
(Continued)

(52) U.S. Cl.
CPC ............. *F16H 61/18* (2013.01); *B60K 20/02* (2013.01); *F16H 59/0204* (2013.01); *F16H 59/10* (2013.01); *G05G 1/04* (2013.01); *G05G 5/00* (2013.01); *G05G 1/10* (2013.01); *G05G 5/02* (2013.01)

(58) Field of Classification Search
CPC ...... F16H 59/02; F16H 59/0204; F16H 59/10; F16H 2059/0221; F16H 2059/0252;
(Continued)

(56) References Cited

U.S. PATENT DOCUMENTS

| 5,497,673 | A | * | 3/1996 | Kataumi | ................. F16H 59/10 |
| | | | | | 29/434 |
| 2008/0163714 | A1 | * | 7/2008 | Wang | ...................... F16H 61/24 |
| | | | | | 74/473.23 |
| 2017/0030461 | A1 | * | 2/2017 | Rhew | ...................... F16H 63/38 |

FOREIGN PATENT DOCUMENTS

| JP | 4888006 B2 | 2/2012 |
| JP | 2014201185 A | 10/2014 |

(Continued)

OTHER PUBLICATIONS

Extended European Search Report for European Application No. 16871011.9 dated Jul. 8, 2019 (5 pages).
(Continued)

*Primary Examiner* — Prasad V Gokhale
(74) *Attorney, Agent, or Firm* — Reising Ethington, P.C.

(57) ABSTRACT

An apparatus for preventing mal-operation for an automatic transmission, which is formed as one body including a plurality of parts, is provided, whereby it is possible to simplify the structure and the manufacturing process thereof.

8 Claims, 7 Drawing Sheets

(51) Int. Cl.
  *F16H 59/10* (2006.01)
  *G05G 5/00* (2006.01)
  *G05G 1/04* (2006.01)
  *F16H 59/02* (2006.01)
  *G05G 1/10* (2006.01)
  *G05G 5/02* (2006.01)

(58) Field of Classification Search
  CPC ....... F16H 2059/026; F16H 2059/0295; F16H 2059/082; F16H 61/18; F16H 2061/185; F16H 63/38; B60K 20/00; B60K 20/02; B60K 20/04; B60K 20/08; G05G 1/04; G05G 5/00; G05G 5/02; G05G 5/04; G05G 5/06
  See application file for complete search history.

(56) References Cited

FOREIGN PATENT DOCUMENTS

| KR | 20030016654 A | 3/2003 |
|----|---------------|--------|
| KR | 20040050990 A | 6/2004 |
| KR | 20090058384 A | 6/2009 |
| KR | 101514898 B1  | 4/2015 |
| KR | 101552045 B1  | 9/2015 |

OTHER PUBLICATIONS

International Search Report for PCT/KR2016/013893 dated Mar. 13, 2017; 2 pages.
English Translation of International Search Report for PCT/KR2016/013893 dated Mar. 13, 2017; 2 pages.

\* cited by examiner

APPARATUS FOR PREVENTING MAL-OPERATION FOR AUTOMATIC TRANSMISSION

INTRODUCTION

The present disclosure relates to an apparatus for preventing mal-operation for an automatic transmission, and more particularly, to an apparatus for preventing mal-operation for an automatic transmission that prevents a gear lever of a straight type automatic transmission device from being erroneously shifted to a lower gear (M, L, third, second or first) when shifting the gear lever from P or R to D.

A straight type automatic transmission device with a button installed at a vehicle shifts gears of the vehicle by forward/backward manipulation of the gear lever from the driver, and when the driver presses the button and shifts from a gear position (in general, P, R) located at the front side with respect to N (neutral) into D (drive), in case that the driver quickly manipulates the gear lever without looking at the transmission, the gear lever may slip through D and go into a lower gear (M, L, third, second or first) dissimilar to the driver's intention.

Such mal-operation may cause accidents depending on road traffic conditions, the location of the vehicle, and driving conditions.

To solve this problem, when quickly shifting the gear lever from P or R to D, erroneous shifting of the gear lever to a lower gear (M, L, third, second or first) is prevented using the conventional apparatus for preventing mal-operation for an automatic transmission as shown in FIG. 1.

However, the conventional apparatus for preventing mal-operation for an automatic transmission includes a plurality of parts such as a body 1, a stopper 2, a damper 3, a return spring (not shown) and a body spring 4 and so on, resulting in complex structure and intricate manufacturing process, and increased cost and weight due to a large number of parts. Additionally, there are problems with noise and erroneous assembly caused by gaps between parts.

SUMMARY

The present disclosure is designed to solve the above-described problem, and therefore the present disclosure according to an embodiment is directed to providing an apparatus for preventing mal-operation for an automatic transmission, which is formed as one body including a plurality of parts whereby it is possible to simplify the structure and the manufacturing process thereof.

To achieve the above-described object, an apparatus for preventing mal-operation for an automatic transmission according to an embodiment of the present disclosure includes, a stopper which restricts a pawl provided in a gear lever from moving to a lower gear when shifting the gear lever from P or R to ID, a body having a stopper support to support an other side surface of the stopper which restricts the pawl from moving to a lower gear when shifting the gear lever from P or R to ID, a stopper neck which is elastic and connects the stopper to the body; and a body spring protruding from a bottom of the body to elastically support the body moving down as the pawl presses down an upper part of the stopper when shifting the gear lever from D to a lower gear, and preferably, the stopper, the stopper neck, the body, the stopper support and the body spring are integrally formed.

In an embodiment, the apparatus for preventing mal-operation for an automatic transmission of the present disclosure is formed as one body including a plurality of parts whereby it is possible to simplify the structure and the manufacturing process thereof.

Accordingly, it is possible to reduce the manufacturing cost and weight of the apparatus for preventing mal-operation for an automatic transmission, and to prevent noise caused by gaps between parts.

DETAILED DESCRIPTION

Hereinafter, an apparatus for preventing mal-operation for an automatic transmission according to a preferred embodiment of the present disclosure will be described in detail with reference to the accompanying drawings.

Figure 1:
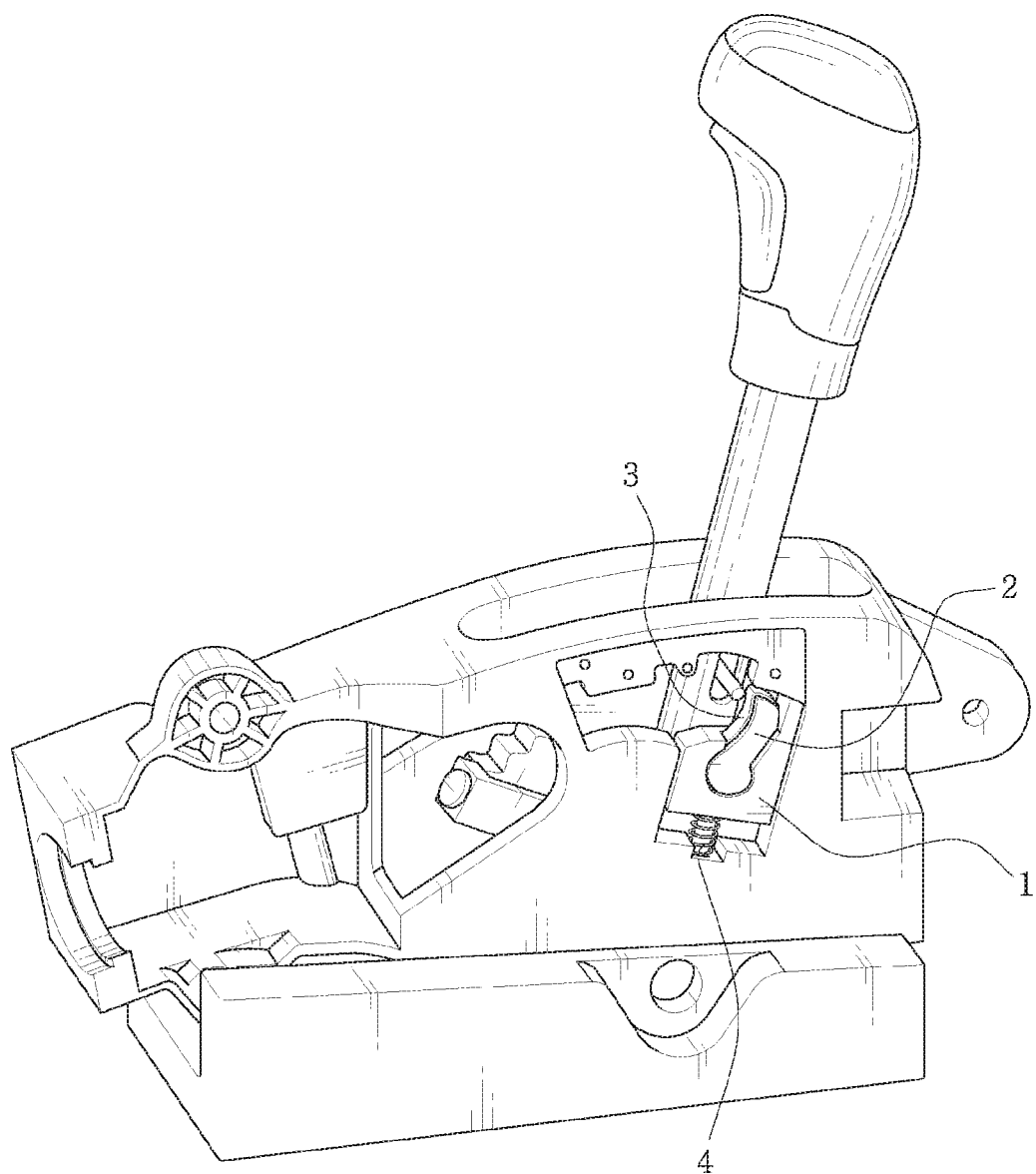
FIG. 1 is a diagram showing an example of conventional apparatus for preventing mal-operation for an automatic transmission.
Figure 2:
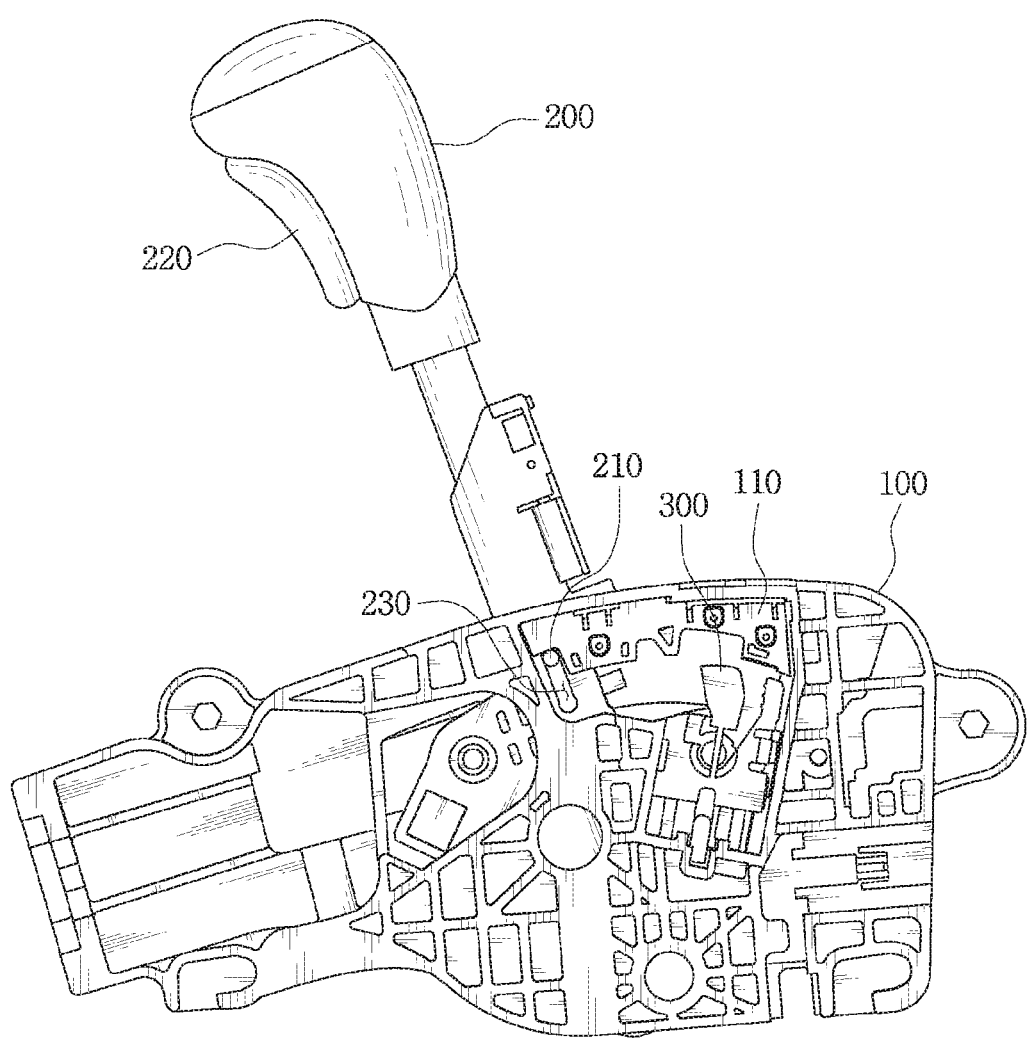
FIG. 2 is a diagram showing an example of an automatic transmission assembly with an apparatus for preventing mal-operation for an automatic transmission according to an embodiment of the present disclosure.
Figure 3:
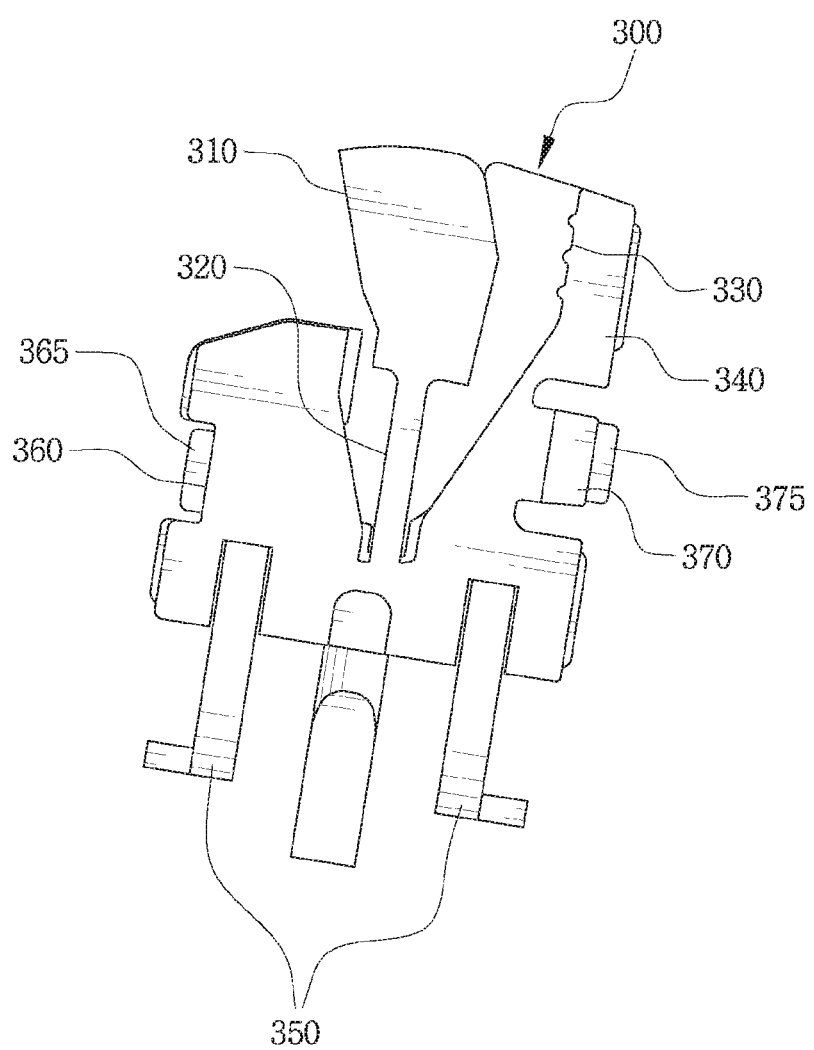
FIG. 3 is a front view of an apparatus for preventing mal-operation for an automatic transmission according to an embodiment of the present disclosure.
Figure 4:
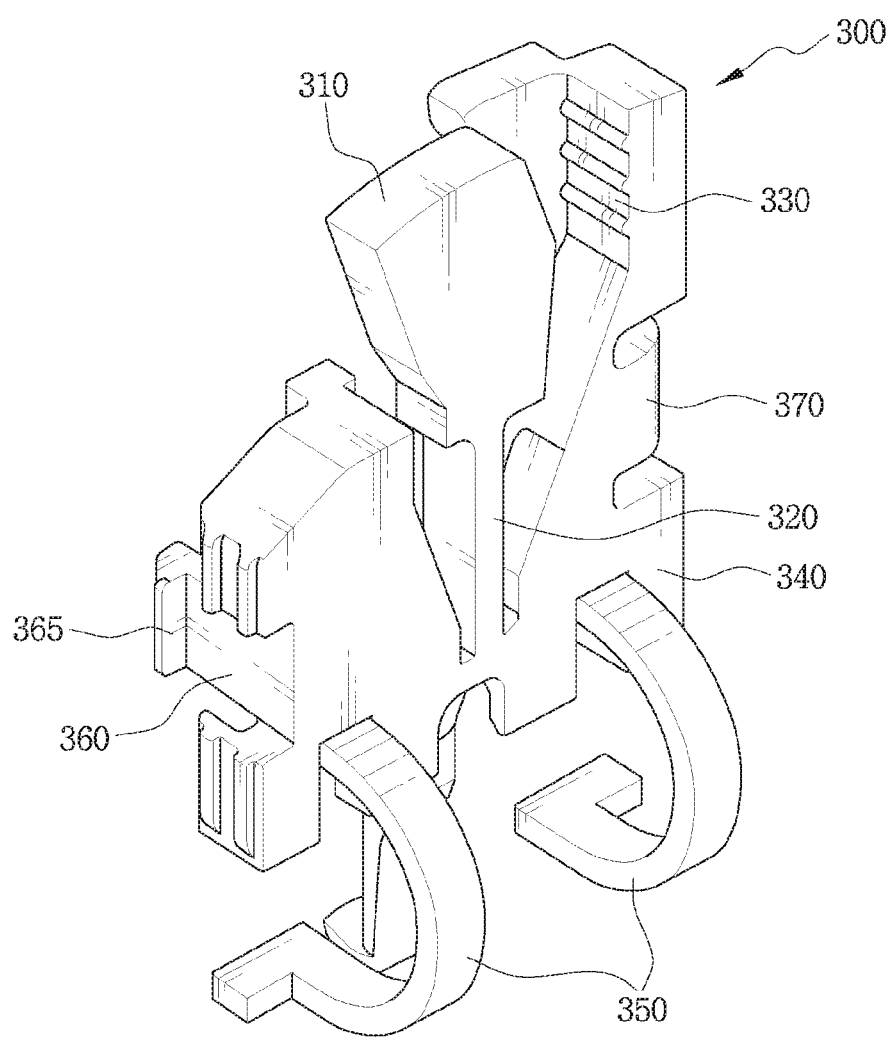
FIG. 4 is a perspective view of an apparatus for preventing mal-operation for an automatic transmission according to an embodiment of the present disclosure.

FIG. 2 is a diagram showing an automatic transmission assembly with an apparatus for preventing mal-operation for an automatic transmission according to an embodiment of the present disclosure, FIG. 3 is a front view of the apparatus for preventing mal-operation for an automatic transmission according to an embodiment of the present disclosure, and FIG. 4 is a perspective view of the apparatus for preventing mal-operation for an automatic transmission according to an embodiment of the present disclosure.

The automatic transmission assembly applied to the present disclosure includes a housing 100, a gear lever 200, and an apparatus 300 for preventing mal-operation for an automatic transmission.

The housing 100 forms the exterior of the automatic transmission assembly, and includes a detent 110.

The detent 110 has a stepped shape at the bottom.

The gear lever 200 has a rod shape, is installed with its bottom inserted into the housing 100 so that the gear lever 200 can pivotally move forth and back, and includes a pawl 210 and a shift button 220.

The pawl 210 has a rod shape, and is positioned movably up and down within a guide 230 penetrating in lengthwise direction of the gear lever 200 at the lower part of the gear lever 200.

Additionally, the pawl 210 can move forth and back with the movement of the gear lever 200.

The shift button 220 is positioned at the upper part of the gear lever 200, and the pawl 210 moves up and down by manipulation of the shift button 220. That is, when the shift button 220 is pressed, the pawl 210 moves down, and when the pressed shift button 220 is released, the pawl 210 moves up.

The apparatus 300 for preventing mal-operation for an automatic transmission is positioned at the rear side on the movement path along which the pawl 210 moves forth and back, to prevent the gear lever 200 from being erroneously shifted to a lower gear (M, L, third, second or first) when shifting the gear lever 200 from P or R to D.

As shown in FIGS. 3 and 4, the above-described apparatus 300 for preventing mal-operation for an automatic transmission includes a stopper 310, a body 340 with a stopper support 330, a body spring 350, a first connector 360 and a second connector 370, and the stopper 310, the body 340 with the stopper support 330, the body spring 350, the first connector 360 and the second connector 370 are preferably integrally formed.

As described above, the apparatus 300 for preventing mal-operation for an automatic transmission including the stopper 310, the body 340 with the stopper support 330, the body spring 350, the first connector 360 and the second connector 370 integrally formed may be made of a plastic material with elasticity, and may be made of an aluminum material.

Here, the stopper 310 is positioned on the movement path along which the pawl 210 provided in the gear lever 200 moves forth and back, to restrict the pawl 210 that moves forth and back with the movement of the gear lever 200, from moving to a lower gear (M, L, third, second or first) when shifting the gear lever 200 from P or R to D.

The above-described stopper 310 can move forth and back by the elastic force of the stopper neck 320.

The body 340 has the stopper support 330 to support the other side surface of the stopper 310 which restricts the pawl 210 from moving to a lower gear (M, L, third, second or first) when shifting the gear lever 200 from P or R to D.

Here, the pawl 210 moving back with the movement of the gear lever 200 comes into contact with one side surface of the stopper 310 positioned on the movement path along which the pawl 210 moves forth and back.

The stopper 310 contacted with the pawl 210 is pressed by the pawl 210 moving back with the movement of the gear lever 200, and moves back by the elastic force of the stopper neck 320, and as the other side surface of the stopper 310 is supported on the stopper support 330 formed integrally in the body 340, the pawl 210 is restricted from moving to a lower gear (M, L, third, second or first).

Here, the movement of the pawl 210 is restricted by the stopper 310, and thus its movement is limited to a location at which the pawl 210 can move straight to D.

Additionally, preferably, the stopper 310 and the stopper support 330 are spaced apart at a predetermined distance, and as the other side surface of the stopper 310 pressed by the pawl 210 is supported on the stopper support 330, the pawl 210 is restricted from moving to a lower gear (M, L, third, second or first).

Additionally, the upper part of the stopper 310 and the upper part of the body 340 are preferably formed with no step.

The stopper neck 320 is elastic, and connects the stopper 310 to the body 340.

During shifting the gear lever 200 from P or R to D, when the pawl 210 moving back with the movement of the gear lever 200 comes into contact with one side surface of the stopper 310 and presses the stopper 310, the above-described stopper neck 320 moves the stopper 310 back by the elastic force until the stopper 310 is supported on the stopper support 330. Additionally, when the pawl 210 of which movement to a lower gear (M, L, third, second or first) is restricted by the stopper 310 moves up, the stopper neck 320 allows the stopper 310 to return to the original location by elastic force restoration.

The first connector 360 and the second connector 370 connect the apparatus 300 for preventing mal-operation for an automatic transmission to the housing 100, and preferably, the first connector 360 and the second connector 370 are integrally formed in the body 340.

The above-described first connector 360 and second connector 370 extend rearward (to the housing) from two side ends of the body 340, and as shown in FIGS. 3 and 4, stopper steps 365, 375 are formed at the ends extending rearward (to the housing) and are engaged in or disengaged from stopper grooves (not shown) provided in the housing 100.

The housing 100 has the stopper grooves (not shown) corresponding to the stopper steps 365, 375 formed in the first connector 360 and the second connector 370, and the stopper grooves (not shown) preferably have a predetermined length to allow the body 340 to move up and down.

As described above, in a state that the stopper steps 365, 375 of the first connector 360 and the second connector 370 are each connected to the stopper grooves (not shown) provided in the housing 100, during shifting the gear lever 200 from D to a lower gear, the first connector 360 and the second connector 370 guide the body 340 upward and downward, wherein when the pawl 210 presses down the upper part of the stopper 310, the body 340 moves down along the stopper grooves (not shown) provided in the housing 100 by the elastic force of the body spring 350, and when the pawl 210 pressing down the upper part of the stopper 310 moves up, the body 340 returns to the original location by elastic force restoration of the body spring 350.

The body spring 350 protrudes from the bottom of the body 340, and elastically supports the body 340 moving down as the pawl 210 presses down the upper part of the stopper 310 during shifting the gear lever 200 from D to a lower gear (M, L, third, second or first).

A plurality of body springs 350 may be implemented, and each body spring 350 may be formed in semi-ring shape.

Hereinafter, the operation of the apparatus for preventing mal-operation for an automatic transmission according to an embodiment of the present disclosure will be described with reference to FIGS. 5 to 7.

Figure 5:
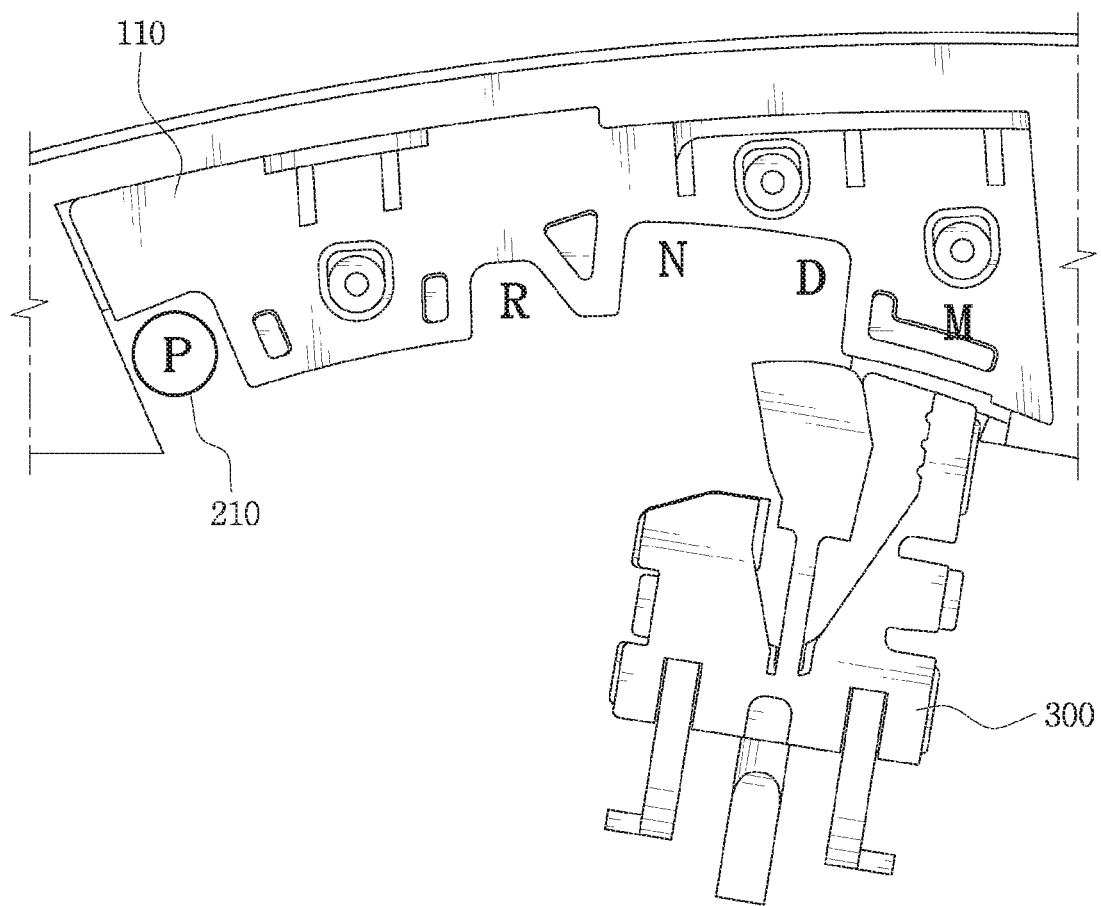
FIGS. 5 to 7 are diagrams illustrating the operation of an apparatus for preventing mal-operation for an automatic transmission according to an embodiment of the present disclosure.

First, with the intention of shifting the gear lever 200 from P to D, as shown in FIG. 5, when the shift button 220 is pressed in a state that the gear lever 200 is positioned in P, the pawl 210 positioned in P moves down along the guide 230, and when the gear lever 200 is pulled back, the pawl 210 moves back accordingly.

As above, the pawl 210 moving back comes into contact with one side surface of the stopper 310 positioned on the movement path along which the pawl 210 moves forth and back, the stopper 310 contacted with the pawl 210 is pressed and moved back by the pawl 210 moving back with the movement of the gear lever 200, and as the other side surface of the stopper 310 is supported on the stopper support 330 integrally formed in the body 340, the pawl 210 is restricted from moving to a lower gear (M, L, third, second or first).

Figure 6:
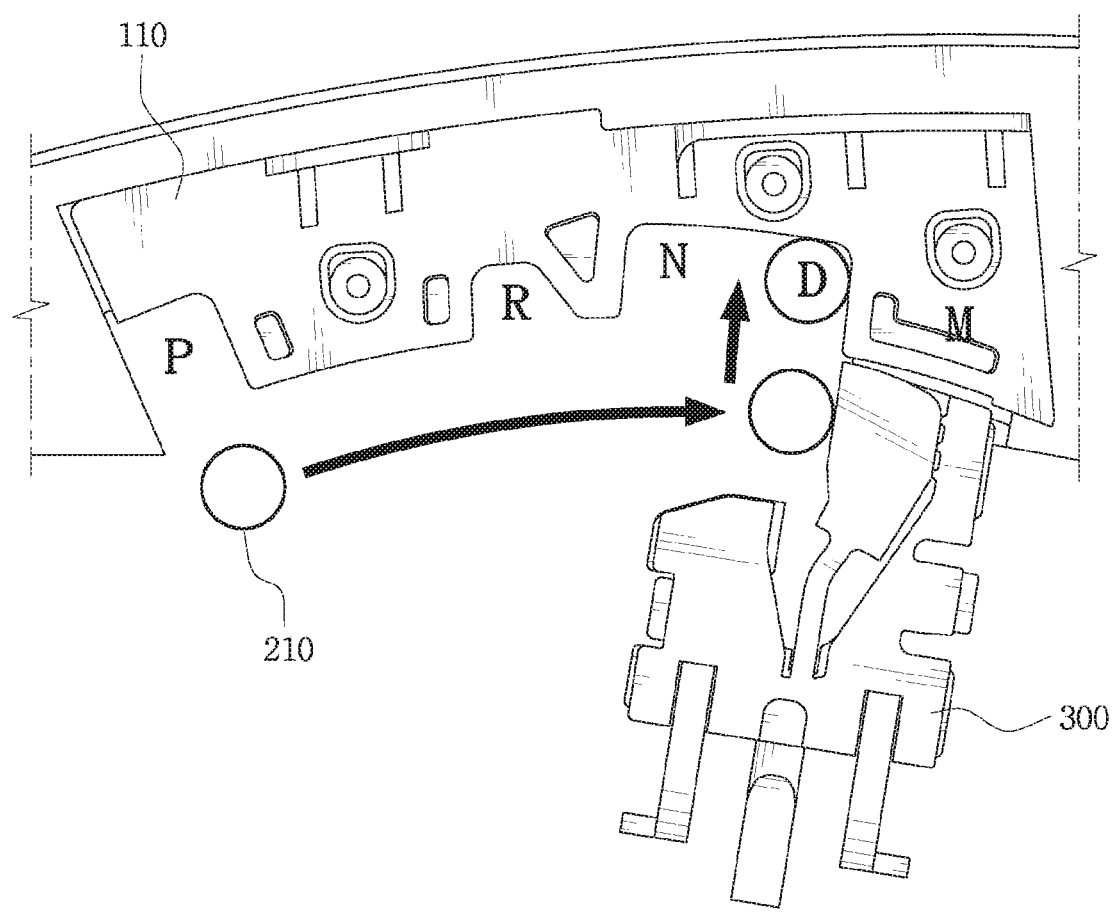

That is, as shown in FIG. 6, the stopper 310 prevents the pawl 210 from moving to a lower gear (M, L, third, second or first), and limits the movement of the pawl 210 to a location at which the pawl 210 can move straight to D.

As shown in FIG. 6, when the pressed shift button 220 is released in a state that the pawl 210 is restricted from moving to a lower gear (M, L, third, second or first), the pawl 210 moves up and is placed in D, and the stopper 310 returns to the original location by elastic force restoration of the stopper neck 320.

Figure 7:
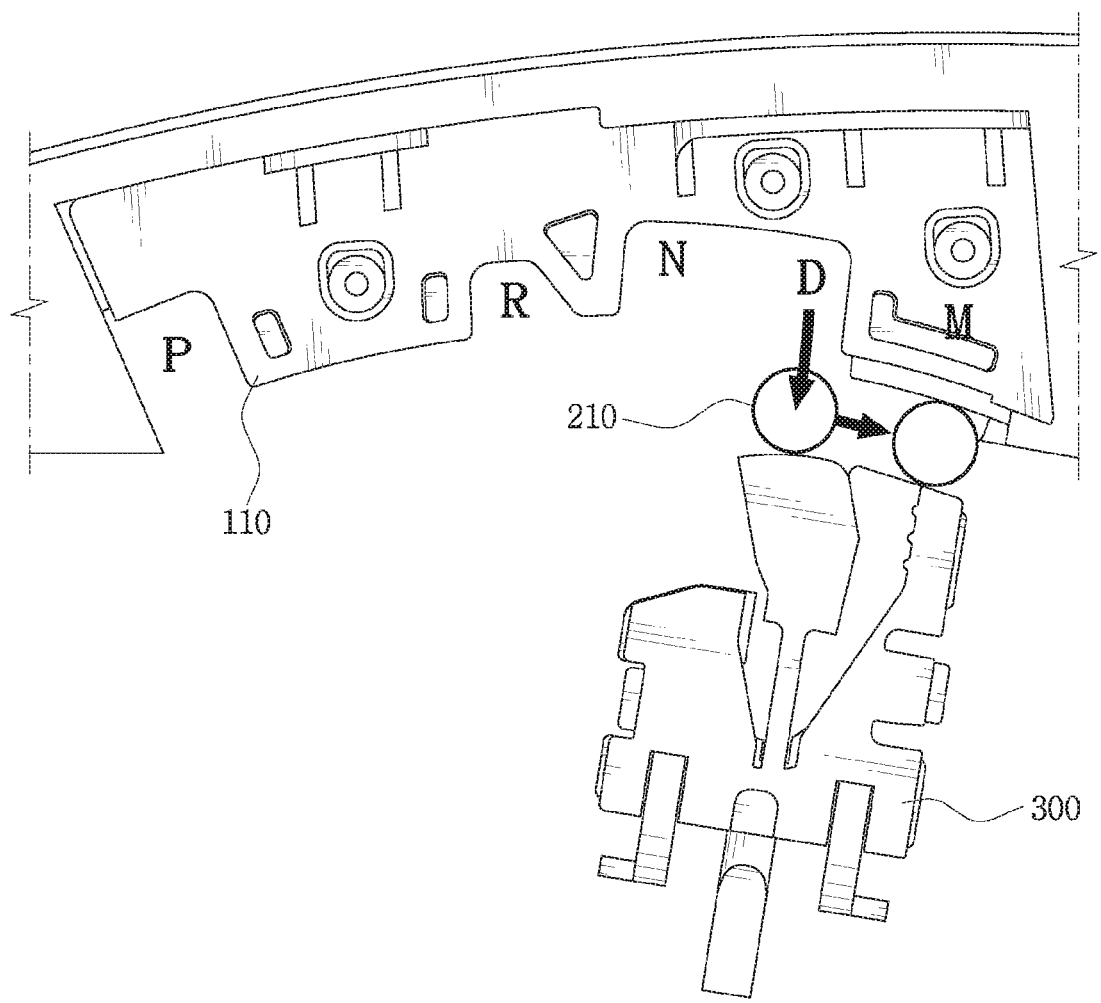

As above, with the intention of shifting the gear lever 200 positioned in D to a lower gear (M, L, third, second or first), when the shift button 220 is pressed in a state that the gear lever 200 is positioned in D, the pawl 210 positioned in D presses down the upper part of the stopper 310 while moving down along the guide 230, and as shown in FIG. 7, the body 340 moves down by the elastic force of the body spring 350, and in this state, when the gear lever 200 is pulled back, the pawl 210 moves to a lower gear (M, L, third, second or first), and when the pressed shift button 220 is released, the pawl 210 is positioned into a lower gear (M, L, third, second or first).

Meanwhile, with the intention of shifting the gear lever 200 positioned in a lower gear (M, L, third, second or first) to another gear (any one of P, R, N and D), the pawl 210 having moved down moves forward with the movement of the gear lever 200, and because the upper part of the stopper 310 and the upper part of the body 340 are formed with no step, the pawl 210 can move forward. In this instance, the stopper 310 may move forward by the elastic force of the stopper neck 320.

Additionally, when the pawl 210 pressing down the upper part of the stopper 310 moves to another gear (any one of P, R, N and D), the body 340 returns to the original location by elastic force restoration of the body spring 350.

As described above, the apparatus for preventing mal-operation for an automatic transmission according to an embodiment of the present disclosure can prevent unintentional mal-operation when manipulating the automatic transmission, and simplify the structure and manufacturing process by integral formation of the stopper 310, the body 340 with the stopper support 330, the body spring 350, the first connector 360 and the second connector 370 that constitute the apparatus for preventing mal-operation for an automatic transmission. Accordingly, it is possible to reduce the manufacturing cost and weight of the apparatus for preventing mal-operation for an automatic transmission, and to prevent noise and damage of parts caused by gaps between parts.

The apparatus for preventing mal-operation for an automatic transmission according to an embodiment of the present disclosure is not limited to the above-described embodiment and may be variously modified and embodied within the permitted scope of the technical spirit of the present disclosure.

The invention claimed is:

1. An apparatus for preventing mal-operation for an automatic transmission, comprising:
a stopper which restricts a pawl provided in a gear lever from moving to a lower gear when shifting the gear lever from P or R to D;
a body having a stopper support to support an other side surface of the stopper which restricts the pawl from moving to a lower gear when shifting the gear lever from P or R to D;
a stopper neck which is elastic and connects the stopper to the body; and
a body spring protruding from a bottom of the body to elastically support the body moving down as the pawl presses down an upper part of the stopper, when shifting the gear lever from D to a lower gear,
wherein the stopper, the stopper neck, the body, the stopper support and the body spring are integrally formed.

2. The apparatus for preventing mal-operation for an automatic transmission according to claim 1, further comprising:
a first connector and a second connector connecting the apparatus for preventing mal-operation for an automatic transmission to a housing having a detent,
wherein the first connector and the second connector are integrally formed in the body.

3. The apparatus for preventing mal-operation for an automatic transmission according to claim 2, wherein during shifting the gear lever from D to a lower gear, the first connector and the second connector guide the body upward and downward, wherein when the pawl presses down the upper part of the stopper, the body moves down by an elastic force of the body spring, and when the pawl pressing down the upper part of stopper moves up, the body returns to an original location by elastic force restoration of the body spring.

4. The apparatus for preventing mal-operation for an automatic transmission according to claim 1, wherein the stopper and the stopper support are spaced apart at a predetermined distance.

5. The apparatus for preventing mal-operation for an automatic transmission according to claim 1, wherein during shifting the gear lever from P or R to D, when the pawl presses one side surface of the stopper, the stopper neck moves the stopper back by an elastic force until the stopper is supported on the stopper support, and
when the pawl of which movement to a lower gear is restricted by the stopper moves up, the stopper neck allows the stopper to return to an original location by elastic force restoration.

6. The apparatus for preventing mal-operation for an automatic transmission according to claim 1, which comprises a plurality of body springs.

7. The apparatus for preventing mal-operation for an automatic transmission according to claim 6, wherein the plurality of body spring are formed in a semi-ring shape.

8. The apparatus for preventing mal-operation for an automatic transmission according to claim 1, wherein the body spring is formed in a semi-ring shape.

* * * * *